(12) United States Patent
Ye

(10) Patent No.: US 9,981,572 B2
(45) Date of Patent: May 29, 2018

(54) MULTI-FUNCTIONAL BACKSEAT FOR GOLF CART

(71) Applicant: Chongqing Richland Mold Corp., Chongqing (CN)

(72) Inventor: Lin Ye, Chongqing (CN)

(73) Assignee: CHONGQING RICHLAND MOLD CORP., Chongqing (CN)

( * ) Notice: Subject to any disclaimer, the term of this patent is extended or adjusted under 35 U.S.C. 154(b) by 0 days. days.

(21) Appl. No.: 15/356,646

(22) Filed: Nov. 20, 2016

(65) Prior Publication Data
US 2018/0099586 A1    Apr. 12, 2018

(30) Foreign Application Priority Data
Oct. 8, 2016   (CN) .................. 2016 2 1103033 U

(51) Int. Cl.
| | | |
|---|---|---|
| *A47C 7/02* | (2006.01) | |
| *B60R 21/02* | (2006.01) | |
| *B60N 2/24* | (2006.01) | |
| *B60N 2/44* | (2006.01) | |
| *B60N 2/46* | (2006.01) | |

(52) U.S. Cl.
CPC ............... *B60N 2/24* (2013.01); *B60N 2/44* (2013.01); *B60N 2/46* (2013.01); *B60R 21/02* (2013.01); *B60R 2021/028* (2013.01)

(58) Field of Classification Search
CPC .... B60N 2/24; B60N 2/44; B60N 2/46; B60R 21/02; B60R 2021/02
USPC ............................................. 297/440.15, 487
See application file for complete search history.

(56) References Cited

U.S. PATENT DOCUMENTS

| | | | | |
|---|---|---|---|---|
| 5,341,894 A * | 8/1994 | Van Gorder, Jr. | ..... | B60K 28/10 180/271 |
| 5,513,868 A * | 5/1996 | Barr | ..... | B62D 63/062 280/400 |
| 6,279,993 B1 * | 8/2001 | Berthiaume | ..... | B60N 2/24 297/219.1 |
| 6,293,604 B1 * | 9/2001 | Williams | ..... | B60K 37/00 296/65.01 |
| 6,578,854 B2 * | 6/2003 | Wucherpfennig | . | A63B 71/0009 180/330 |
| 7,156,443 B1 * | 1/2007 | Jung | ..... | B60N 2/24 280/748 |
| 7,232,183 B1 * | 6/2007 | Haught | ..... | B60N 2/646 297/219.1 |
| 7,735,896 B2 * | 6/2010 | Kubota | ..... | B60N 2/3013 296/37.14 |
| 7,980,628 B2 * | 7/2011 | Hu | ..... | B60N 2/005 296/37.15 |

(Continued)

*Primary Examiner* — Rodney B White
(74) *Attorney, Agent, or Firm* — Cheng-Ju Chiang

(57) ABSTRACT

The present utility model discloses a multi-functional backseat for a golf cart. The multi-functional backseat for the golf cart comprises a seat bracket, a seat plate provided with double seats, a carrier plate and a pedal, wherein the seat bracket is fixed on the pedal, the carrier plate is fixed on the seat bracket, the seat plate is movably connected onto the carrier plate and is rotatable around the carrier plate, the carrier plate is provided with armrests, backrests and back cushions, and the pedal is provided with a safety guard rail. The multi-functional backseat for the golf cart of the present utility model can be used for carrying people and goods with high safety.

5 Claims, 3 Drawing Sheets

(56) References Cited

U.S. PATENT DOCUMENTS

| | | | | |
|---|---|---|---|---|
| 8,091,749 B2* | 1/2012 | Stautzenberger, Sr. | ... | B60R 9/00 224/274 |
| 8,191,966 B1* | 6/2012 | Longenette | .......... | B60N 2/6018 297/218.1 |
| 8,353,534 B2* | 1/2013 | Arnold | ................ | B60N 2/3013 280/748 |
| 9,457,756 B2* | 10/2016 | Hirooka | ................ | B60R 21/13 |
| 9,481,265 B2* | 11/2016 | Moore | ................ | B60N 2/0292 |
| 9,764,768 B1* | 9/2017 | Hokes | .................... | B60R 21/13 |
| 2005/0264048 A1* | 12/2005 | Collins | ............... | B60N 2/3095 297/188.01 |
| 2007/0228711 A1* | 10/2007 | Hanson | ................... | B60N 2/38 280/748 |
| 2008/0079305 A1* | 4/2008 | Miyajima | ............... | B60N 2/24 297/452.21 |
| 2010/0060026 A1* | 3/2010 | Bowers | ............... | B60N 2/3013 296/66 |
| 2010/0308614 A1* | 12/2010 | Arnold | ................ | B60N 2/3013 296/37.6 |
| 2014/0217797 A1* | 8/2014 | Heit | ......................... | B60P 1/04 297/354.1 |

* cited by examiner

MULTI-FUNCTIONAL BACKSEAT FOR GOLF CART

BACKGROUND OF THE INVENTION

Technical Field

The present utility model relates to the technical field of golf carts, and in particular to a multi-functional backseat for a golf cart.

Description of the Related Art

In the back of a current golf cart, people can stand but not sit, and there is no protective means provided when people stand, which is unsafe; and meanwhile, the golf cart has no carrier function and cannot carry goods, and goods can only be carried with the use of an additional tool.

BRIEF SUMMARY OF THE INVENTION

A technical problem to be solved by the present utility model is to provide a multi-functional backseat for a golf cart capable of carrying people and goods safely.

To solve the problem above, the present utility model provides a multi-functional backseat for a golf cart. The multi-functional backseat for the golf cart comprises a seat bracket, a seat plate provided with double seats, a carrier plate and a pedal, wherein the seat bracket is fixed on the pedal, the carrier plate is fixed on the seat bracket, the seat plate is movably connected onto the carrier plate and is rotatable around the carrier plate, the carrier plate is provided with armrests, backrests and back cushions, and the pedal is provided with a safety guard rail.

Further, both the carrier plate and the seat plate are provided with rotary shafts, and the rotary shafts are movably connected through connecting sheets.

Further, the carrier plate vertically extends upwards to form a connection portion, two ends of the connection portion are provided with rotary shafts, and the connection portion has a width less than the width of the carrier plate.

Further, the carrier plate is also provided with fall-proof guard rails.

Further, the carrier plate is provided with a backrest mounting base, and the backrests and the back cushions are disposed on the mounting base through insertion.

Further, the backrests comprise backrest bodies and backrest insertion members, and the backrest insertion members are fixed on the backrest bodies.

Further, the back cushions comprise back cushion bodies and back cushion insertion members, and the back cushion insertion members are fixed on the back cushion bodies.

Further, the safety guard rail is provided with cup holders.

The multi-functional backseat for the golf cart of the present utility model is provided with the seat plate and the pedal, the seat plate allows people to sit and also to place their feet on the peal while sitting, making people in the back feel more comfortable. In case of carrying goods, the goods may be placed on the carrier plate and the seat plate after overturning the seat plate, thereby carrying goods without the help of other tools to achieve convenience in use. Meanwhile, the backseat is provided with the safety guard rail which may prevent people from falling, thereby achieving more safety and reliability.

DETAILED DESCRIPTION OF THE INVENTION

The present utility model will be further illustrated in combination with the accompanying drawings below.

Figure 1:
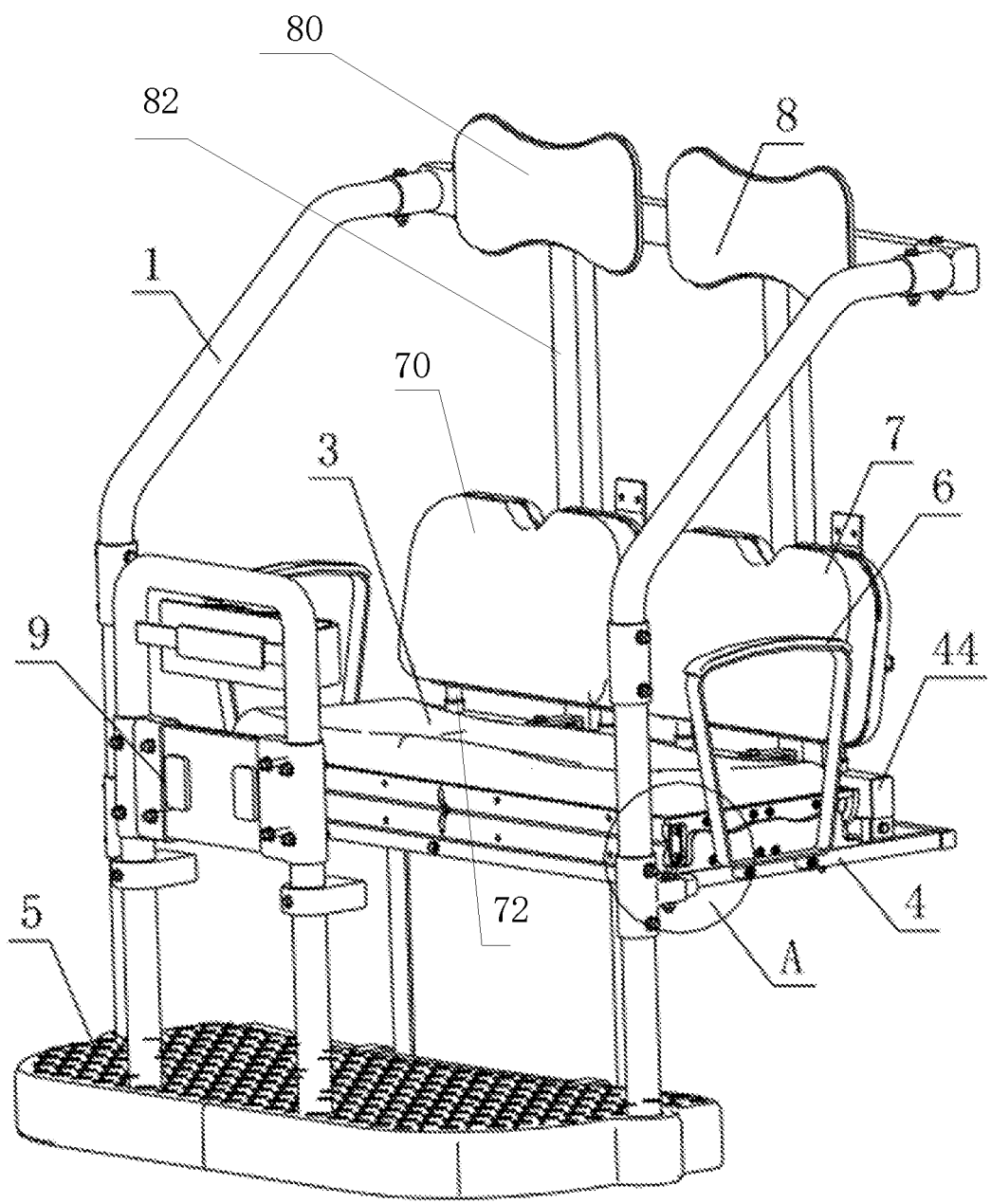
FIG. 1 is a schematic diagram of a structure of a multi-functional backseat for a golf cart of the present utility model in a preferred embodiment.
Figure 2:
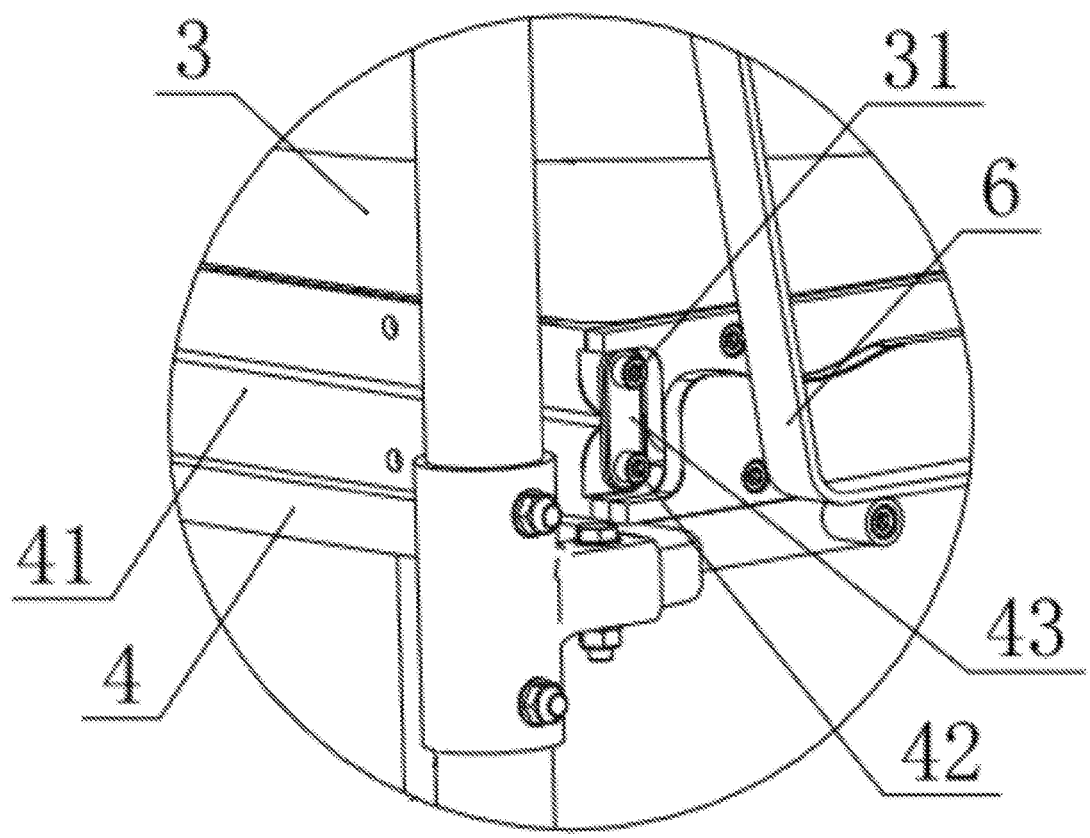
FIG. 2 is a partially enlarged view of FIG. 1.
Figure 3:
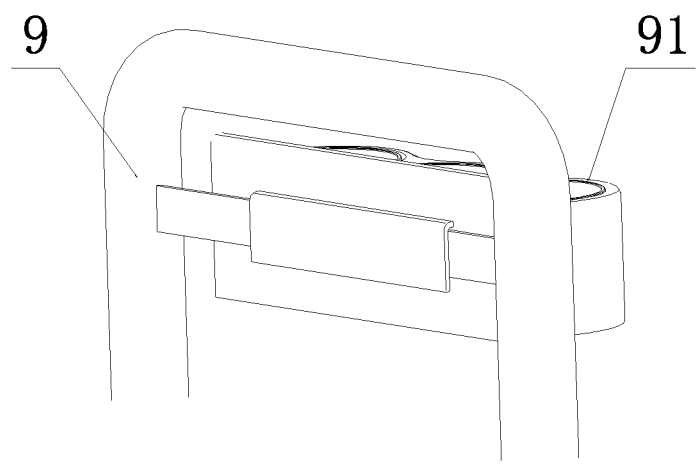
FIG. 3 is a partially enlarged view of a safety guard rail.

As shown in FIGS. 1 to 3, a multi-functional backseat for a golf cart of the present utility model in a preferred embodiment structurally comprises a seat bracket 1, a seat plate 3 provided with double seats, a carrier plate 4 and a pedal 5. The seat bracket 1 and the golf cart are fixed, the seat bracket 1 is fixed on the pedal 5, the carrier plate 4 is fixed on the seat bracket 1, the seat plate 3 is movably connected onto the carrier plate 4 and is rotatable around the carrier plate 4, the carrier plate 4 is provided with armrests 6, backrests 7 and back cushions 8, and the pedal 5 is provided with a safety guard rail 9. The safety guard rail 9 is available for the arrangement of tail lights and stop lights; the safety guard rail 9 is provided with three cup holders 91 for holding cups so that people do not need to hold the cups in their hand, thereby achieving more convenience. The seat bracket 1 is overlooked to take a U shape, thus the seat bracket 1 can also be used as an armrest 6, and a user may place their hands on the seat bracket 1, the armrests 6 or the safety guard rail 9 according to personal needs.

The backrests 7 comprise backrest bodies and backrest insertion members, and the backrest insertion members are fixed on the backrest bodies. The back cushions 8 comprise back cushion bodies and back cushion insertion members, and the back cushion insertion members are fixed on the back cushion bodies.

The carrier plate 4 has a front end vertically extending upwards to form a connection portion 41, two ends of the connection portion 41 are provided with rotary shafts 42, and the connection portion 41 has a width less than the width of the carrier plate 4; the carrier plate 3 is provided with rotary shafts 31, which are movably connected with the rotary shafts 42 on the connection portion 41 through connecting sheets 43; thus, when the seat plate 3 is overturned, the connecting sheets 43 rotate along with the seat plate 3 and rotary shafts 42 press against the carrier plate 4 after being overturned to a certain extent, so that the seat plate 3 cannot be overturned continuously and thus is limited in overturning, and the seat plate 3 at the point is exactly flushed with the carrier plate 4. The carrier plate 4 has a back end provided with a backrest mounting base 44, and the backrests 7 and the back cushions 8 are disposed on the backrest mounting base 44 through insertion. To be specific, the backrest mounting base 44 is provided with inserted connection holes, and both backrest insertion members and back cushion insertion members are inserted into the inserted connection holes for facilitating assembly. Two sides of the carrier plate 4 are provided with fall-proof guard rails capable of preventing goods from falling from the sides during the carrying of the goods.

The multi-functional backseat for the golf cart of the present utility model is provided with the seat plate 3 and the pedal 5, the seat plate 3 allows people to sit and also to place their feet on the peal 5 during sitting, making people in the back feel more comfortable. In case of carrying goods, the goods may be placed on the carrier plate 4 and the seat plate 3 after overturning the seat plate 3, thereby carrying goods without the help of other tools to achieve convenience in use. Meanwhile, the backseat is provided with the safety guard rail 9 which may prevent people from falling, achieving more safety and reliability.

The foregoing merely illustrates the embodiments of the present utility model, but is not intended to thereby limit the patent scope of the present utility model. Any equivalent structures obtained by utilizing the specification and accompanying drawings of the present utility model and applied to other relevant technical fields directly or indirectly likewise fall under the scope of patent protection of the present utility model.

What is claimed is:

1. A multi-functional backseat for a golf cart, wherein the multifunctional backseat for the golf cart comprises a seat bracket, a seat plate having left and right sides, the seat plate provided with double seats, a carrier plate having left and right sides, the carrier plate located underneath the seat plate, and a pedal extending below and in front of the seat plate and the carrier plate, wherein the seat bracket is fixed on the pedal, the carrier plate is fixed on the seat bracket, the seat plate is movably connected to the carrier plate and is rotatable around the carrier plate, the carrier plate is provided with armrests at the left and right sides, at least two backrests extending upwardly from the seat plate and two backrest cushions secured to the backrests, and the pedal is provided with a safety guard rail extending upwardly from a front end of the pedal and is located forwardly of the carrier plate and the seat plate, front ends of both the right and the left sides of the carrier plate and the seat plate are provided with a rotary shaft, and the rotary shafts on corresponding sides of the carrier plate and the seat plate are movably connected by a connecting sheet, the carrier plate has a front end that extends upwardly and vertically to form a connection portion, left and right ends of the connection portion are provided with the rotary shafts of the carrier plate, wherein the connection portion has a width less than the width of the carrier plate.

2. The multi-functional backseat for the golf cart of claim 1, wherein the carrier plate is provided with a backrest mounting base, and the backrests and the backrest cushions are disposed on the mounting base through insertion.

3. The multi-functional backseat for the golf cart of claim 1, wherein the backrests comprise backrest bodies and backrest insertion members, and the backrest insertion members are fixed on the backrest bodies.

4. The multi-functional backseat for the golf cart of claim 1, wherein the backrest cushions comprise the backrest cushion bodies and the backrest cushion insertion members, and the backrest cushion insertion members are fixed on the backrest cushion bodies.

5. The multi-functional backseat for the golf cart of claim 1, wherein the safety guard rail is provided with cup holders.

* * * * *